May 15, 1934.  R. BROUWER  1,958,907

LEAKPROOF SEAL AND CLOSURE

Filed May 25, 1928

INVENTOR:
RODGER D BROUWER,
BY Gales P. Moore
HIS ATTORNEY.

Patented May 15, 1934

1,958,907

UNITED STATES PATENT OFFICE 1,958,907

LEAKPROOF SEAL AND CLOSURE

Rodger Brouwer, Bristol, Conn., assignor, by mesne assignments, to General Motors Corporation, Detroit, Mich., a corporation of Delaware Application May 25, 1928, Serial No. 280,486

11 Claims. (Cl. 286—5)

This invention relates to leakproof seals and closures and comprises all the features of novelty herein disclosed. An object of the invention is to provide an improved seal for closing the space between a shaft and a housing to avoid leakage of liquid. Another object is to provide a simple and efficient seal wherein the force of capillary attraction operates on a liquid to prevent its leaking past a closure device. To these ends and also to improve generally and in detail upon devices of this general character, the invention consists in the various matters hereinafter described and claimed.

In its broader aspects, the invention is not necessarily limited to the specific embodiments selected for illustrative purposes in the accompanying drawing in which Fig. 1 is a sectional view of a shaft and housing having the improved seal.

Figure 1:
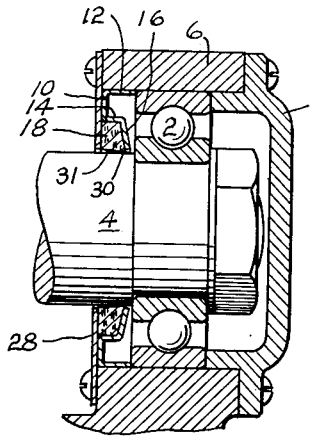
Figure 2:
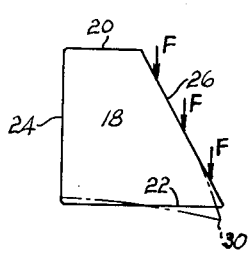
Figs. 2 and 3 are diagrams.
Figure 3:
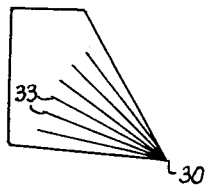

The invention is well adapted for retaining lubricating oil in an antifriction bearing which supports a shaft and a hub or housing for relative rotation. In Fig. 1, a ball bearing 2, supporting a shaft 4, is mounted in a chambered housing 6 containing oil and closed at one end by a cap 8. The other end of the housing is closed by a seal comprising casing plates holding joint material such as cork, felt, leather or similar material which is flexible and somewhat elastic and not deleteriously affected by lubricant. The principle of capillary attraction is utilized to make the joint between the joint material and the shaft leakproof. A casing plate or washer is shown as having an annular side wall 10, a supporting flange 12 fitting the housing 6, and a dished or recessed portion comprising an inwardly directed cylindrical wall 14 and a conical flange 16. A thick washer 18 of the selected joint material is then cut out, preferably in the cross sectional form of a trapezoid, having upper and lower parallel sides 20 and 22, a side wall 24 at right angles to the parallel sides and an inclined side wall 26. The washer is cut thicker, however, than the recess formed by the dished casing plate so that the material can be laterally compressed, as by the clamping closure plate 28. The clamping plate forces the joint material against the conical flange 16 throughout the whole extent of the latter to its inner edge and the resisting forces afforded by the flange have vertical components (indicated by the arrows F in Fig. 2) which distort the material thereby making the bore wall 22 assume a slightly conical shape (indicated by the dot and dash line in Fig. 2) with one end 30 of the bore wall substantially in contact with the shaft and with the remainder of the bore wall diverging or receding from the shaft at a uniform angle and forming a capillary recess 31. If any oil reaches the recess, the tendency is for it to be drawn back towards the point 30, so sealing the joint. It will be understood that the flange 16 and plate 28 have a small clearance with the shaft. The most efficient angle between the bore of the washer and the shaft is about 4° or 5°; when the angle becomes much less than 4° or more than 5° the capillary effect rapidly diminishes. It is preferred to have one end of the bore wall of the washer in contact with the shaft although the benefits of the invention are obtained as long as the bore closely surrounds the shaft at the point 30. When the joint material is fibrous and absorbent like felt, the angle is hard to control but whatever capillary effect is lost by an inaccurate angle is compensated for by a capillary effect produced by the fibers 33 which, because of the compressive forces, converge towards the point 30 as indicated diagrammatically in Fig. 3.

Figure 4:
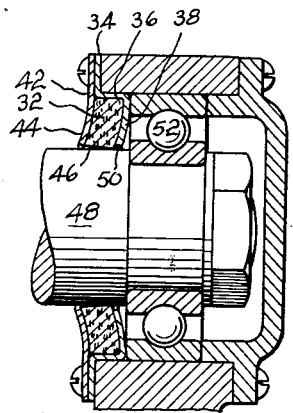
Figs. 4, 5 and 6 are sectional views similar to Fig. 1 and disclosing other embodiments of the invention.

In Fig. 4, a capillary space is obtained without cutting the joint material to a special shape in cross section. A washer 32, preferably of cork or felt, and of initially rectangular cross section is enclosed in a flanged cup having a holding flange 34, a cylindrical wall 36 and an inclined or flaring flange 38. A clamping closure plate 42, flaring outwardly at 44 in substantially equidistant relation to the flange 38 curls or bends the joint material and causes it to assume the shape indicated wherein a capillary space 46 is formed between the bore and the shaft 48. The flange 38 has a short reverse curve at 50 in order that the inner wall of the joint material may not become so inclined as to form a capillary space tending to suck the oil out of the chamber enclosing the bearing 52.

Figures 5, 5A:
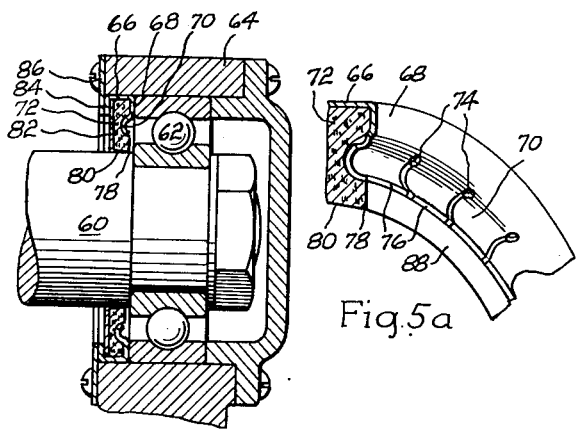
Figs. 5a and 6a are enlarged detail views of parts appearing in Figs. 5 and 6, respectively.
Figures 6, 6A:
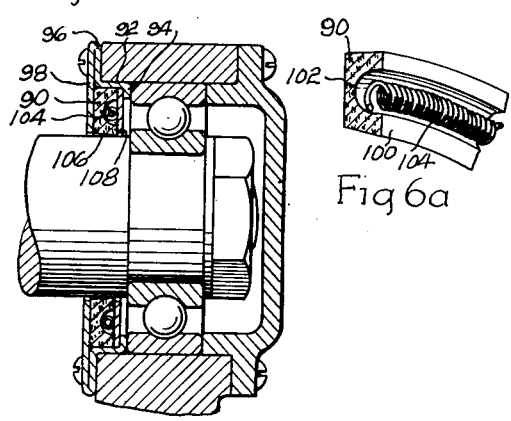

In Fig. 5, a shaft 60 is shown mounted on a ball bearing 62 enclosed in a housing 64. A sheet metal casing plate having a cylindrical outer wall 66 is enclosed in the housing and has an annular side wall 68 abutting against the outer race ring of the bearing. The casing plate has a dished or curved wall 70 which enters a recess formed in the side of a washer 72, preferably of cork. The curved wall 70 has a plurality of openings 74 from which the metal is slit down to the edge thereby making a substantially continuous series of spring fingers 76 which tend to press one end only of the joint material lightly against the shaft at 78 and to maintain a capillary recess at 80. The outer wall of the joint material is engaged by a closure plate or washer 82 held by a flange 84 bent inwardly from the cylindrical wall 66. The sealing instrumentalities are held in the chamber of the housing by a holding plate 86. The cork washer 72 is preferably cut initially with a conical bore at 80 which is a little larger than the shaft except at the end adjacent to the point 78 while the spring fingers are relied on merely to insure a light contact of the cork with the shaft at 78. Under some circumstances, however, the washer may be initially cut to rectangular cross section with a side groove, the bore wall being initially larger than the shaft throughout and the spring fingers bending the annular lip 88 into contact with the shaft at 78 and making a capillary recess. In Fig. 6, a washer 90, preferably of cork, is enclosed in a casing plate having a cylindrical wall 92, an inwardly bent flange 94, an outwardly bent flange 96, and a folded side wall 98. The washer has an annular lip 100 formed by a side groove 102 which receives a contractile coil spring 104 in the form of a ring to hold the lip 100 lightly against the shaft and so form a capillary space at 106. A closure plate 108 for the casing is held by the bent flange 94. In this instance also, the joint material is preferably cut initially with a conical bore but by making the groove 102 deep enough and the spring strong enough, the free lip 100 may be caused to bend and form a capillary recess.

In the drawing, the seal is arranged to prevent escape of oil from a chamber but by reversing the direction of divergence of the capillary recess, the seal can be used to prevent water or other liquid from getting into a chamber such as that containing a bearing packed in grease.

I claim:

1. A seal for making a leakproof joint between a shaft and a housing and comprising an annular sheet metal casing fitting in the housing, a washer enclosed in the casing and having a bore which is slightly conical, the smaller end of the bore wall substantially contacting with the shaft and the bore wall diverging from the shaft at a capillary angle to form a capillary recess between the washer and the shaft, and means for holding the washer in the casing; substantially as described.

2. A seal for making a leakproof joint between a shaft and a housing and comprising an annular sheet metal casing fitting in the housing, a washer enclosed in the casing and having a tapering bore wall, the smaller end of the bore wall substantially meeting the shaft and the tapering bore wall diverging from the shaft at a uniform angle and forming a capillary recess, and a closure plate engaging the side of the washer and holding it in the casing; substantially as described.

3. A seal for making a leakproof joint between a shaft and a housing and comprising an annular sheet metal casing fitting in the housing, a washer fitting in the casing and having a bore which is slightly conical, the smaller end only of the bore wall fitting the shaft and the bore wall receding from the shaft at a small angle to form a capillary recess, means for holding the washer in the casing, and spring means for insuring contact of the smaller end of the bore wall with the shaft; substantially as described.

4. A seal for making a leakproof joint between a shaft and a housing and comprising an annular sheet metal casing fitting in the housing, a washer enclosed in the casing and having a tapering bore wall, the smaller end of the bore wall substantially meeting the shaft and the bore wall diverging uniformly from the shaft at a small angle to form a capillary recess, and a clamping plate closing the casing at the outside of the washer and distorting the washer to cause the bore to assume its tapering shape; substantially as described.

5. A seal for making a leakproof joint between a shaft and a housing and comprising a recessed casing plate having a conical flange extending into close proximity to the shaft, a compressible washer having approximately the cross-sectional shape of the recess and an initial thickness greater than the depth of the recess, one side of the washer engaging the conical flange to the inner edge of the latter and continuing substantially to the shaft, and a clamping closure plate for holding said side of the washer pressed against the conical flange thereby distorting the washer and making its bore wall assume a uniform angle of approximately four degrees with respect to the shaft; substantially as described.

6. A seal for making a leakproof joint between a shaft and a housing and comprising a recessed casing plate having a conical flange extending into close proximity to the shaft, the casing plate having also a supporting flange engaging the housing, a washer having approximately the cross sectional shape of the recess but being initially thicker than the depth of the recess, one side of the washer engaging the conical flange to the inner edge of the latter, and a clamping closure plate for holding said side of the washer pressed against the conical flange thereby distorting the washer and making its bore wall lie at a capillary angle with respect to the shaft; substantially as described.

7. A seal for making a leakproof joint between a shaft and a housing and comprising a recessed casing plate having a flaring flange extending into close proximity to the shaft, a clamping closure plate having a flaring portion in substantially equidistant relation to the flaring flange, and a compressible washer having an initial rectangular cross section held in the recess between the flaring flange and the closure plate and distorted thereby to make its bore wall assume an angle of approximately four degrees at the shaft; substantially as described.

8. A seal for making a leakproof joint between a shaft and a housing and comprising a recessed casing plate having a flaring flange extending into close proximity to the shaft, the casing plate also having an outwardly extending flange to engage the housing, a clamping closure plate having a portion engaging said outwardly extending flange and a flaring portion in substantially equidistant relation to said flaring flange, and a compressible washer pressed between the flaring flange and the flaring portion of the closure plate to make the bore wall of the washer lie at a capillary angle with respect to the shaft; substantially as described.

9. A seal for making a leakproof joint between a shaft and a housing and comprising a casing plate having an outer wall engaging the housing, a side wall extending towards the shaft from the outer wall, a closure plate opposed to said side wall and entering within the outer wall, a flange extending inwardly from the outer wall for holding said closure plate, a washer of compressible material between said closure plate and said side wall, and having the greater portion of its bore wall larger than the shaft to clear the latter said washer having a side recess, and spring means in said recess to cause the bore wall of the washer to assume a uniform angle with respect to the shaft; substantially as described.

10. A seal for making a leakproof joint between a shaft and a housing and comprising a thick washer interposed between the shaft and the housing, the washer being of generally polygonal cross section and having its bore wall contacting only at one end with the shaft, such bore wall receding from the shaft at a small and uniform angle to form a capillary recess which prevents leakage in the direction in which the wall recedes; substantially as described.

11. In a seal for making a leakproof joint between a pair of members which have relative rotation, a washer carried by one of the members and having a wall closely approaching the other member, the wall having one end portion substantially meeting said other member without forcible contact, and the wall receding from said other member at a uniform angle of approximately four degrees to make a capillary recess resisting leakage in the direction in which the wall recedes; substantially as described.

RODGER BROUWER.